US00RE41326E

(19) United States
(12) Reissued Patent
Delucis et al.

(10) Patent Number: US RE41,326 E
(45) Date of Reissued Patent: May 11, 2010

(54) REINFORCED HUB FOR THE ROTOR OF A WIND ENERGY TURBINE

(75) Inventors: Nicolas Delucis, Munster (DE); Vincent Schellings, Enschede (NL)

(73) Assignee: General Electric Company, Schenectady, NY (US)

(21) Appl. No.: 12/148,774

(22) PCT Filed: Apr. 12, 2003

(86) PCT No.: PCT/EP03/03813

§ 371 (c)(1),
(2), (4) Date: Dec. 1, 2005

(87) PCT Pub. No.: WO2004/090326

PCT Pub. Date: Oct. 21, 2004

Related U.S. Patent Documents

Reissue of:
(64) Patent No.: 7,244,102
Issued: Jul. 17, 2007
Appl. No.: 10/517,690
Filed: Dec. 1, 2005

(51) Int. Cl.
*F03D 11/04* (2006.01)

(52) U.S. Cl. ..... 416/156; 416/245 R; 415/908

(58) Field of Classification Search ..... 415/218.1, 415/2.1, 4.1, 4.3, 4.5, 905, 908; 416/244 R, 416/245 R, 155, 156, 157 R, 157 A, 158 B, 416/158; 290/44, 55

See application file for complete search history.

(56) References Cited

U.S. PATENT DOCUMENTS

| | | | |
|---|---|---|---|
| 4,112,693 | A | 9/1978 | Collin et al. |
| 4,668,109 | A | 5/1987 | Basso |
| 4,759,459 | A | 7/1988 | Moroney et al. |
| 4,863,352 | A | 9/1989 | Hauser et al. |
| 4,995,023 | A | 2/1991 | Muller et al. |

FOREIGN PATENT DOCUMENTS

| | | | |
|---|---|---|---|
| EP | 0 546 307 | A1 | 3/1993 |
| WO | WO 1044647 | A2 * | 6/2001 |
| WO | WO 3064854 | A1 * | 8/2003 |

OTHER PUBLICATIONS

PCT International Search Report, PCT/EP2003/03813 filed on Apr. 12, 2003, mailed on Dec. 29, 2003, pp. 3 total.

* cited by examiner

*Primary Examiner*—Richard Edgar
(74) *Attorney, Agent, or Firm*—Blakely, Sokoloff, Taylor & Zafman LLP

(57) ABSTRACT

The hub for the rotor (22) of a wind energy turbine (10) comprises a hollow body (28) rotatable around a rotation axis and provided with at least one flange (34) for mounting to the hollow body (28) a bearing for a rotor blade (26) and at least two stiffening webs (38) integrally formed with the hollow body (28) and radially extending within a flange area (36) of the hollow body (28) surrounded by the flange (34) to the center (40) of the flange area (36), wherein at least two openings are provided within the flange area (36) of the hollow body (28).

20 Claims, 6 Drawing Sheets

REINFORCED HUB FOR THE ROTOR OF A WIND ENERGY TURBINE

Matter enclosed in heavy brackets [ ] appears in the original patent but forms no part of this reissue specification; matter printed in italics indicates the additions made by reissue.

FIELD OF THE INVENTION

The present invention relates to a hub for the rotor of a wind energy turbine and, in particular, to a new construction of such a hub resulting in a light-weighted overall design of the hub.

CROSS-REFERENCE TO OTHER APPLICATIONS

This application is a National Phase Application of International Application No. PCT/EP2003/003813, filed Apr. 12, 2003, to which this application claims priority.

BACKGROUND OF THE INVENTION

One concern in wind energy turbine is weight of the nacelle. In particular the rotatable parts of the nacelle should have a rather low weight. This is true in particular for modern high power wind energy turbines.

One approach for reducing weight is to reduce the wall thickness of the rotating elements of the nacelle. However, reducing the wall thickness does result in a reduced strength and stiffness of the rotating element. In particular, the hub of the rotor is subjected to forces resulting from wind acting on the rotor blades and forces resulting from loads due to the rotation of the hub. The hub must be stiff enough so that these forces do not cause deformations. In particular within the flanges for mounting the bearings for the rotor blades the hub must be designed rather stiff so that an ovalization can be prevented which in turn would damage the rotor blade bearings and pitch drives.

Accordingly, an object of the present invention is to provide a hub for the rotor of a wind energy turbine which has a relative low weight and is stiff enough in order to withstand the loads which during operation of the wind energy turbine acts on the hub.

SUMMARY OF THE INVENTION

This object is solved according to the invention by a hub for the rotor of a wind energy turbine comprising

- a hollow body rotatable around a rotation axis and provided with at least one flange for mounting to the hollow body a bearing for a rotor blade and
- and least two stiffening webs integrally formed with the hollow body and radially extending within a flange area of the hollow body surrounded by the flange to the center of the flange area,
- wherein at least two openings are provided within the flange area of the hollow body.

The hub according to the invention is provided with a hollow body which is rotatable around a rotation axis. The hollow body is provided with at least one flange to which a rotor blade bearing can be mounted. The flange defines a flange area which normally is defined by a hole.

According to the invention, within the hole there are arranged at least two stiffening or strengthening or reinforcing webs integrally formed with the hollow body and radially extending from the flange to the center of the flange area. The webs are arranged within the flange area like spokes of a wheel and provide stiffening, strengthening and reinforcing of the flange. The at least two stiffening webs divide the flange area into at least two openings separated by the stiffening webs.

According to one aspect of the invention, two stiffening webs are provided within each flange area and build an angle between each other of substantially 180°. It is preferred that these two stiffening webs are arranged parallel to the rotation axis of the hub. As an alternative it is also possible that the stiffening webs are arranged such that they extend perpendicular to the rotation axis.

Generally spoken, according to another preferred embodiment of the present invention, the stiffening webs are homogeneously distributed within the flange area and are displaced relative to each other by an angle substantially equal to 360° divided by a number of the stiffening webs. For example in case of three stiffening webs the angles therebetween are substantially 120° and in case of four stiffening webs the angle therebetween is substantially 90°.

In case of three stiffening webs it is preferred that one of the stiffening webs extends substantially parallel to the rotation axis of the hollow body. In case of four stiffening webs it is preferred to have two or them extending parallel to the rotation axis and the other two of them extending perpendicular to the rotation axis.

According to the invention the stiffening webs can be solid or hollow and can have a decreasing width and/or thickness towards the center of the flange area. In other words the stiffening webs at the center of the flange area are smaller in width and/or thickness than at its radially outer ends adjacent the flange.

It is also possible according to the invention that within a flange area there are provided several sets of stiffening webs displaced along a rotor blade pitch axis perpendicular to a plane defined by the flange. The stiffening webs of the individual sets are not connected among each other or are connected. In other words the stiffening webs of the flange area not necessarily are arranged in a common plane but are arranged in different adjacent planes.

In another preferred embodiment of the present invention the stiffening webs of the individual sets of stiffening webs are rotated against each other from set to set around the rotor blade pitch access.

In another embodiment of the present invention a pitch drive can be mounted to at least one of the stiffening webs. This individual stiffening web is provided with an aperture for a rotor shaft of a pitch drive for rotating a rotor blade. Within the area of this aperture, the width or thickness or both of the individual stiffening web is increased in order to increase the stiffness of the web within the area of the pitch drive.

The present invention can be used in a hub irrespective of the number of rotor blades. Accordingly, the hub according to the invention can be for a rotor with one, two or three rotor blades. Also more than three rotor blades can be mounted to the hub according to the invention which is provided with a number of flanges identical to the number of rotor blades.

Most preferably, the hollow body of the hub comprises at least two or three flanges each defining a flange area. Each flange area is provided with at least two stiffening webs wherein the shape, design, number and/or relative arrangement of the stiffening webs within each flange area is identical or different from flange area to flange area.

In order to further reduce the overall weight of the hub additional apertures can be provided within areas between adjacent flanges and the first and the second end of the hollow body both arranged in the direction of the rotation axis. These first and second ends also comprise openings or holes wherein the hole at the second end opposite to the shaft of the rotor is designed as a man hole. It is preferred that this man hole is located within a deepened portion of the hub located at the second end. This design provides increased stiffness of the hub at its man hole end. The first end of the hub to which the hollow shaft of the wind energy turbine is mounted preferably is also provided with a hole but can be closed as an alternative.

BRIEF DESCRIPTION OF THE DRAWINGS

The invention will be described in more detail referring to the drawing wherein.

DESCRIPTION OF PREFERRED EMBODIMENTS OF THE INVENTION

Figure 1:
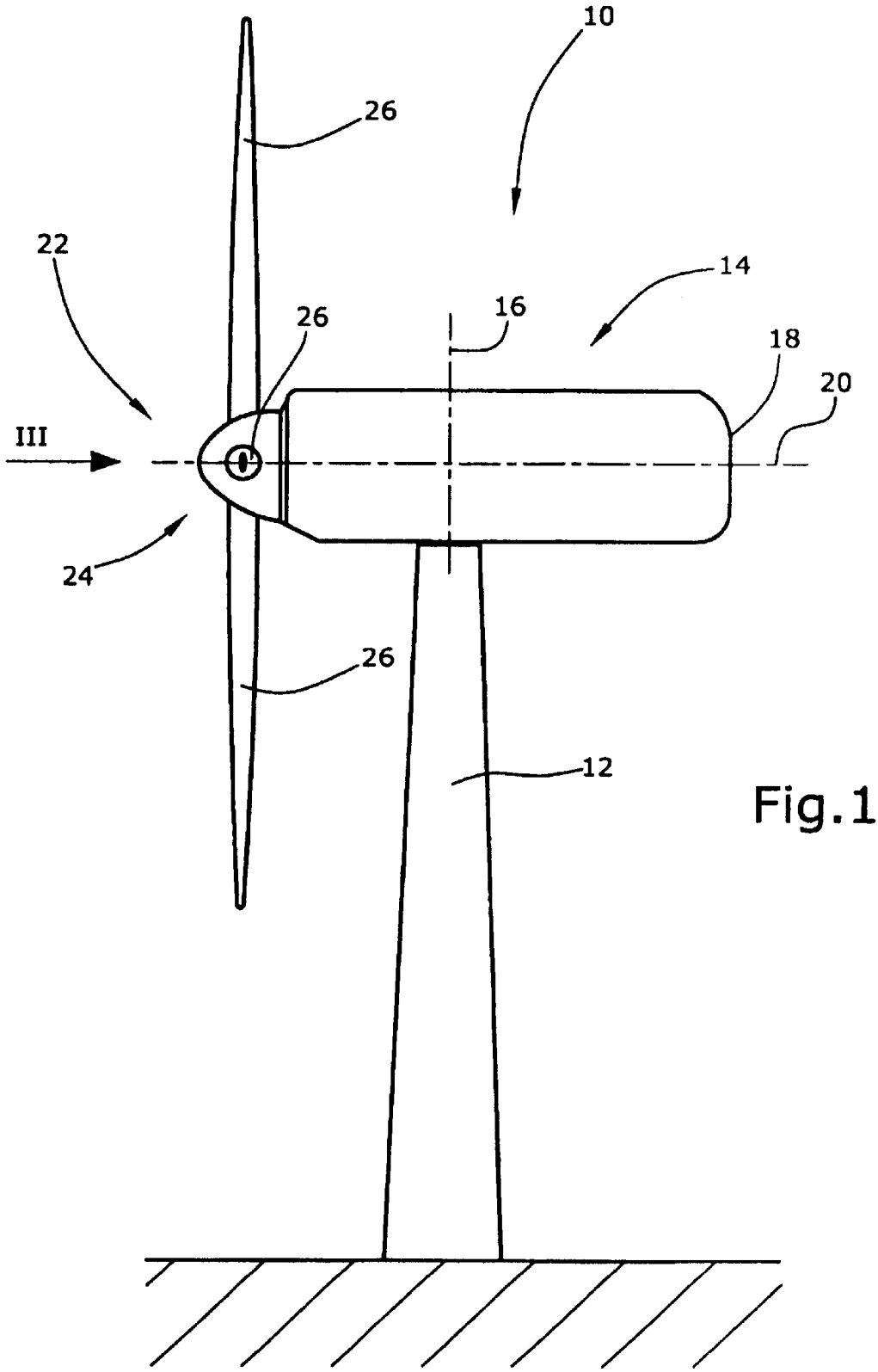
FIG. 1 shows a side view of a wind energy turbine the rotor of which is provided with a hub according to the invention.

FIG. 1 shows the overall construction of a wind energy turbine 10 comprising a tower 12 and a nacelle 14 arranged on top of the tower 12 and rotatable around vertical axis 16. The nacelle 14 comprises a housing 18 within which a shaft (not shown) is rotatably arranged around a horizontal axis 20. Mounted to the shaft is a rotor 22 comprising a hub 24 and three rotor blades 26 radially extending from the hub 24. The horizontal axis 20 is identical to the rotation axis of the rotor 22.

Figure 2:
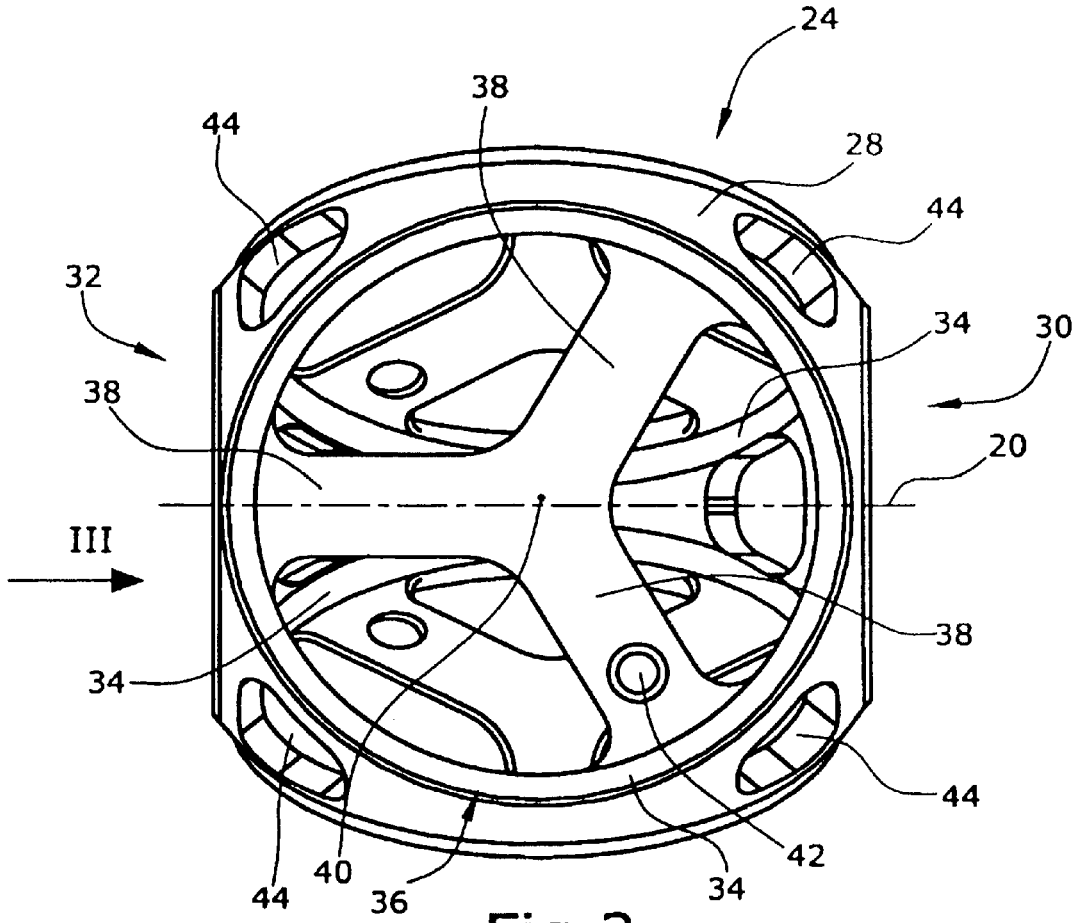
FIG. 2 is an enlarged view of the hub of the wind energy turbine of FIG. 1 according to a first embodiment of the invention.
Figure 3:
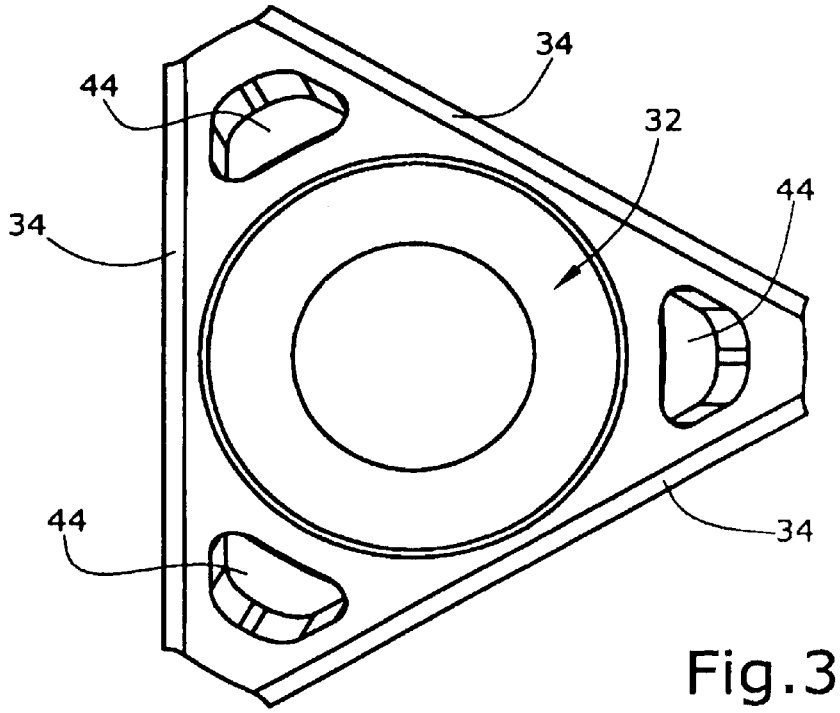
FIG. 3 is a view when looking at the hub in the direction of arrows III of FIGS. 1 and 2.

A preferred embodiment of the hub 24 is shown in more detail in FIG. 2. The hub 24 comprises a hollow body 28 made of a suitable cast material which is basically known to persons skilled in the art. Other materials providing the required rigidity can also be used. The hollow body 28 comprises a first end 30 and a second end 32 wherein the hollow shaft (not shown) of the wind energy turbine 10 is mounted to the first end 30 of the hollow body 28. Three flanges 34 are arranged at the outside of the hollow body 28 wherein these three flanges 34 are displaced by 120°. Each flange 34 defines a flange area 36 within the respective flange 34 and extending in a plane. Within each flange area 36, in this embodiment of the Invention there are provided three stiffening webs 38 integrally formed with the wall of the hollow body 28 and extending from the flange 34 radially inwardly to the center 40 of the flange area 36 where the three stiffening webs 36 are integrally connected to each other. The hollow body 28 including the stiffening webs 38 are formed according to a casting process which processes are basically known for the manufacture of hubs of the rotors of wind energy turbines. Other manufacturing processes for making the hub are also possible.

As can be seen from FIG. 2, the three stiffening webs 38 together are forming the shape of a three-arm-star wherein one of the stiffening webs extend parallel to the rotation axis 20 with an angle of 120° between adjacent stiffening webs 38. One of the stiffening webs 38 comprises an aperture 42 through which the rotor shaft of a rotor blade pitch drive (both not shown) extends for rotating the rotor blade. The pitch drive can be mounted to that specific stiffening web 38.

As can be seen from FIGS. 2 to 5, additional apertures 44 are arranged in the wall of the hollow body 28 within areas defined by two adjacent flanges 34 and the openings at the first and second ends 30,32, respectively. Providing these six holes 44 in these areas further reduces the overall weight of the hollow body 28.

Figure 4:
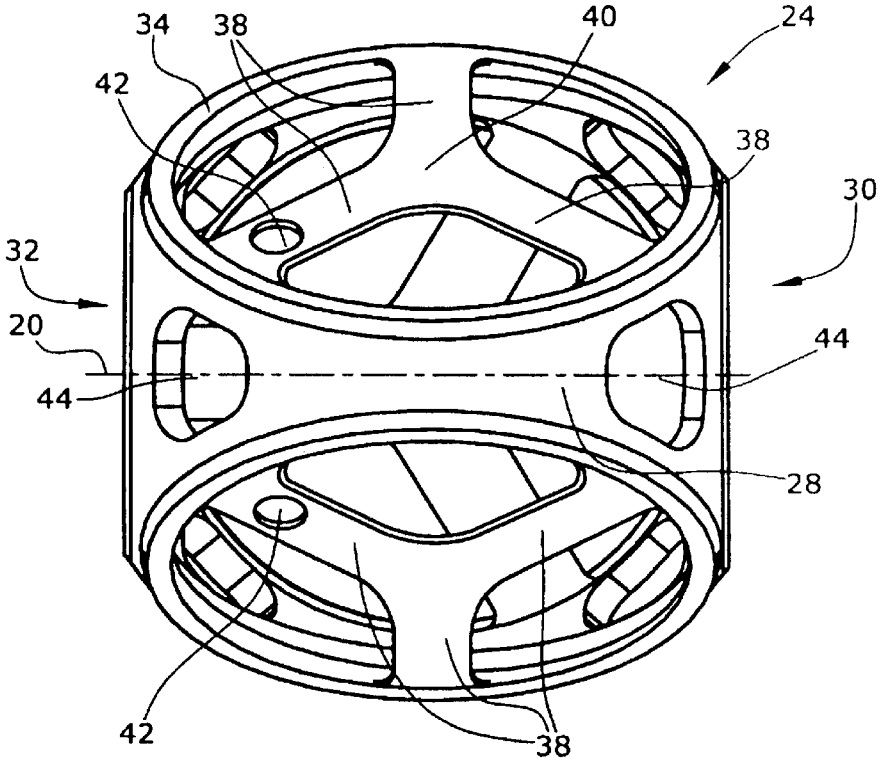
FIG. 4 is a view of the hub similar to that of FIG. 2 but with the hub being rotated by 120°.
Figure 5:
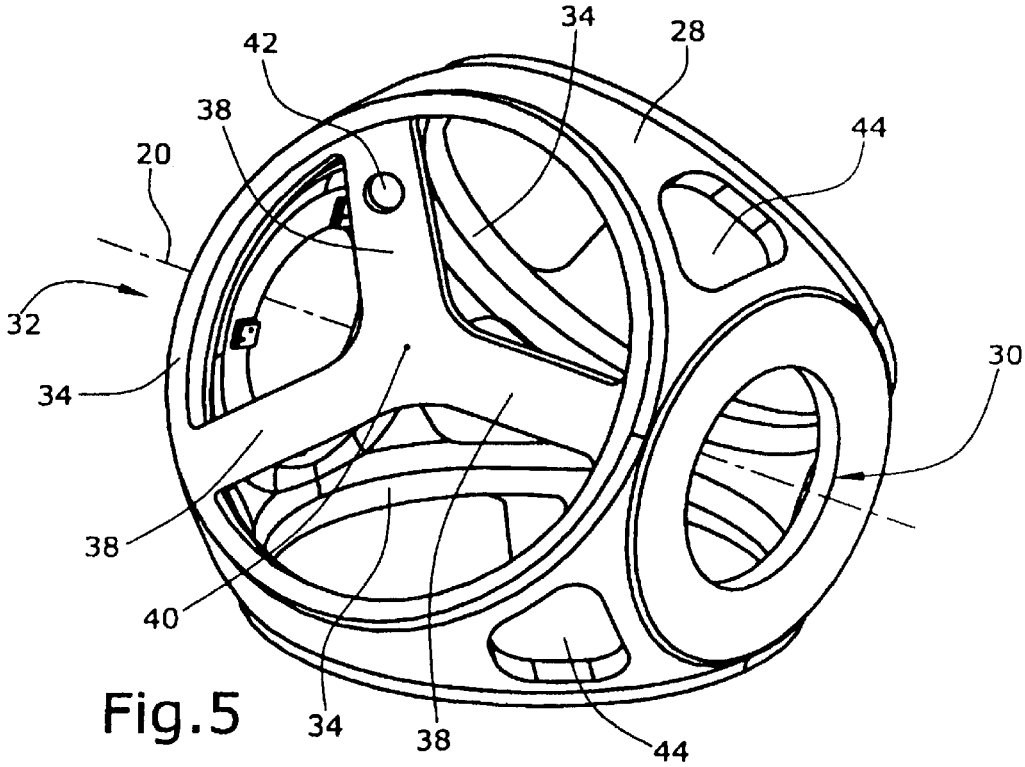
FIG. 5 is a perspective view of the hub according to FIGS. 2 to 4.

FIGS. 4 and 5 show further views of the hub 24 making more evident the specific design of the hub 24 resulting a light-weighted but stiff overall construction of the hub 24.

FIGS. 6 to 10 show other embodiments of a hub according to the invention. In these FIGS., for parts and elements of the hubs identical or similar to the elements of the hub 24 according to FIGS. 2 to 5, the same reference numerals are used.

Figure 6:
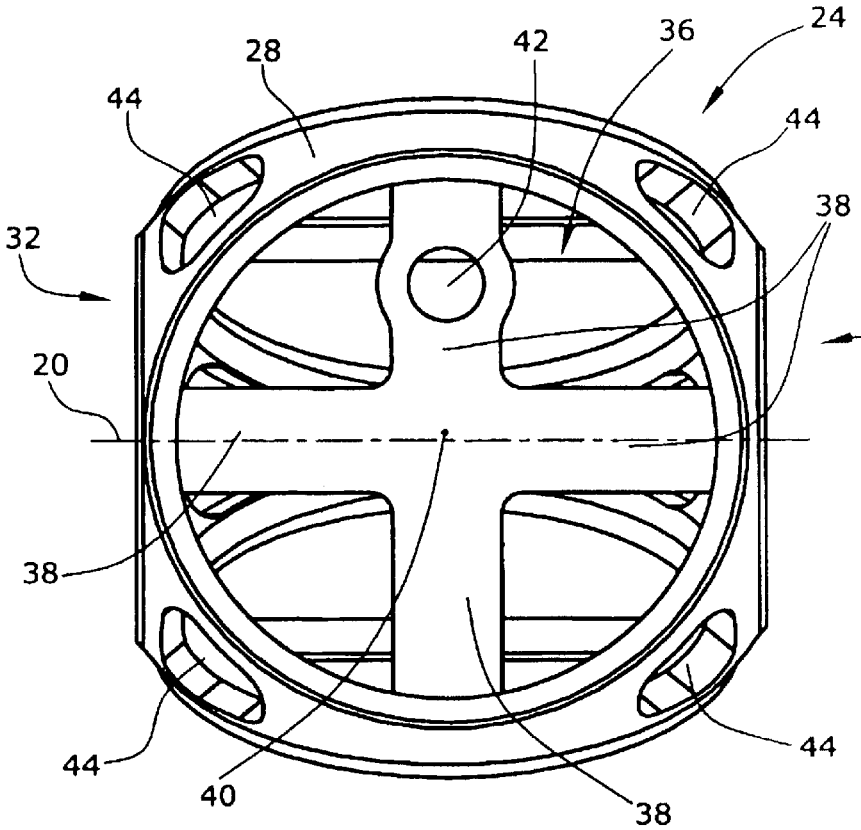
FIG. 6 is a view to an alternative embodiment of a hub according to the invention.

Hub 24 of FIG. 6 comprises four stiffening webs 38 per each flange area 36 wherein one of the stiffening webs 38 is provided with a hole 42 for a pitch drive shaft wherein the thickness of the stiffening web 38 within the area of this aperture 42 is increased. The four stiffening webs 38 are displaced relative to each other by 90° so that the four stiffening webs 38 are in the form of a cross. The remaining design of the hub 24 of FIG. 6 is similar to that of the hub of FIGS. 2 to 5.

Figure 7:
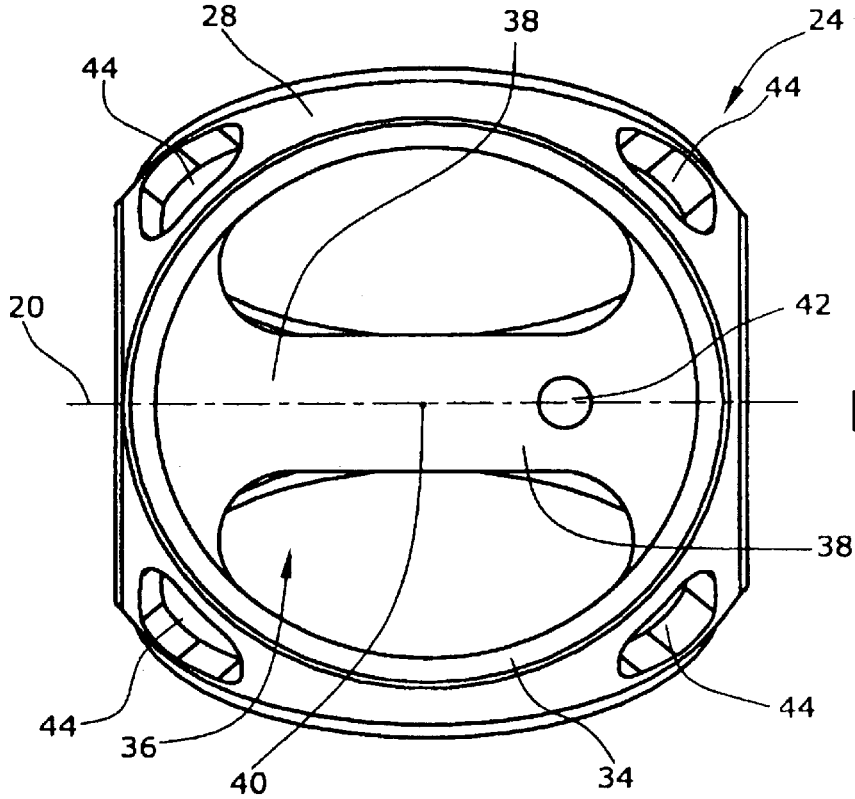
FIG. 7 is a view to a hub according to another embodiment of the invention.

FIG. 7 shows a hub 24 the hollow body 28 of which comprises two stiffening webs 38 which extend parallel to the rotation axis 20 of the hub 24 and which are increased in width and/or thickness within the areas adjacent to the flange 34. In its remaining parts the hub 24 has a design similar to that of the hub of FIGS. 2 to 5.

Figure 8:
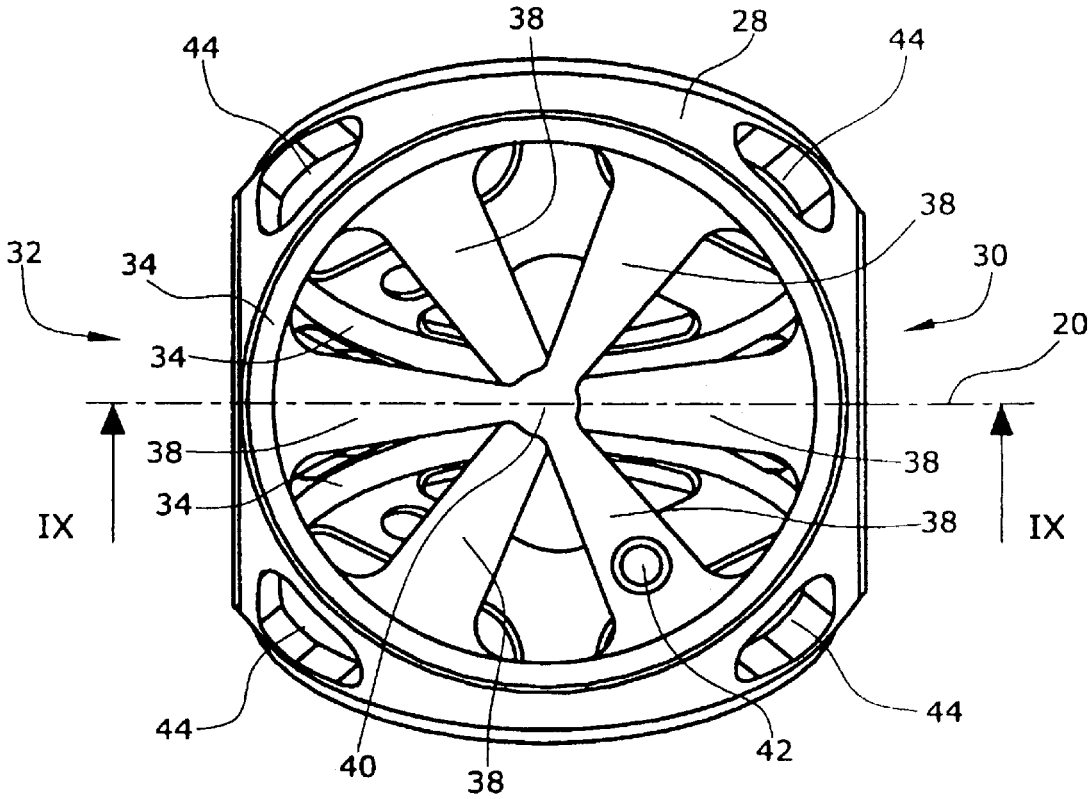
FIG. 8 is a view of a hub according to a further embodiment of the invention.
Figure 9:
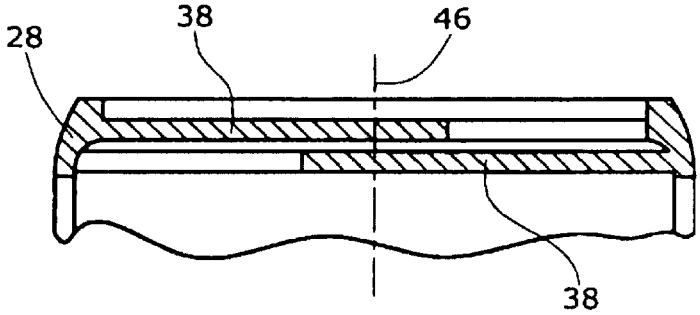
FIG. 9 is a cross-sectional view taken along line IX-IX of FIG. 8.

Another embodiment of a hub 24 is shown in FIGS. 8 and 9. In this embodiment, two sets of stiffening webs 38 arranged as shown in FIG. 2 are located within each flange area. As can be seen from the cross-sectional view according to FIG. 9, the two sets of stiffening elements are displaced along a rotor blade pitch axis 46.

Figure 10:
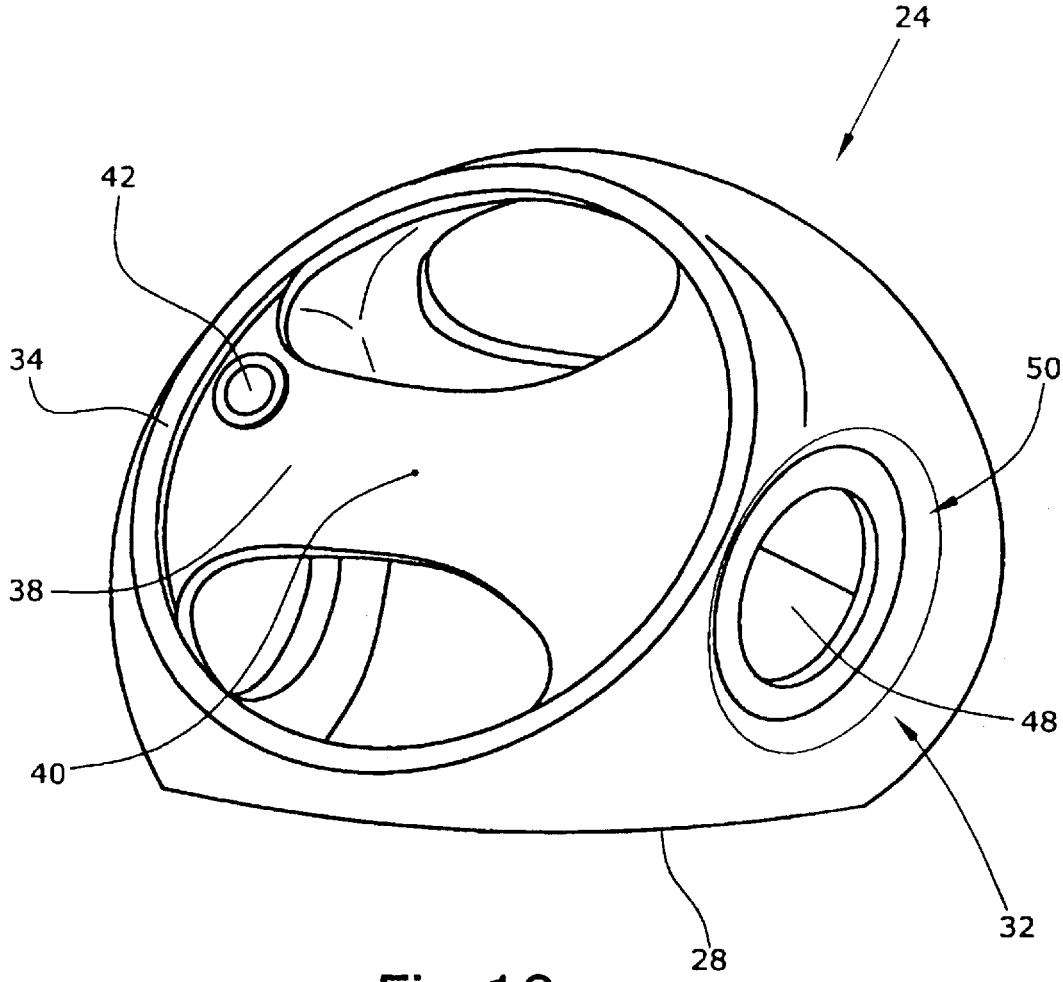
FIG. 10 is a perspective view of a hub according to a last embodiment of the invention.

Finally, FIG. 10 shows a perspective view to another hub 24 from the direction of the second end 32 thereof in which one can see that the man hole 48 arranged at this second end 32 is located within a deepened portion 50 of the wall of the hollow body 28. This deepened portion increases stiffness and rigidity of the hollow body 28. The design of the stiffening webs of the hub 24 of FIG. 10 is similar to that of the embodiment of FIG. 7. However, also other stiffening web designs can be used in a hub 24 having a deepened portion 50 for the man hole 48 at the second end 32 of the hollow body 28.

The invention was described referring to individual embodiments thereof as shown in FIGS. 1 to 10. However, it is to be noted that the invention is not limited to the specific embodiments shown and that the specific design features of all the embodiments shown can be used separately and in combination with each other without departing from a scope of the invention. Accordingly, the scope of the invention exclusively is defined by the accompanying claims.

The invention claimed is:

1. A hub for a rotor of a wind energy turbine comprising:

a hollow body rotatable around a rotation axis and provided with at least one flange for mounting to the hollow body a bearing for a rotor blade; and at least two stiffening webs integrally formed with the hollow body and radially extending within a flange area of the hollow body surrounded by the flange to the center of the flange area, wherein at least two openings are provided within the flange area of the hollow body.

2. The hub according to claim 1, wherein the stiffening webs are homogeneously distributed within the flange area and are displaced relative to each other by an angle substantially equal to 360° divided by the number of the stiffening webs.

3. The hub according to claim 2, wherein at least one of the stiffening webs extends substantially parallel to the rotation axis of the hollow body.

4. The hub according to claim 3, wherein the width or the thickness or both of the stiffening webs decreases towards the center of the flange area.

5. The hub according to claim 4, wherein the stiffening webs are solid or hollow.

6. The hub according to claim 5, wherein at least one of the stiffening webs is provided with an aperture for a rotor shaft of a driving means for rotating a rotor blade when mounted via the bearing to the flange.

7. The hub according to claim 6, wherein the width or thickness or both of the at least one stiffening web is increased within the area of the aperture.

8. The hub according to claim 7, wherein the stiffening webs are arranged within a plane tilted with respect to the rotation axis of the hollow body.

9. The hub according to claim 8, wherein the stiffening webs are arranged in at least two sets of at least two stiffening webs and wherein the two sets of stiffening webs are displaced along a rotor blade pitch axis perpendicular to a plane defined by the flange.

10. The hub according to claim 9, wherein the stiffening webs from set to set are displaced to each other around the blade pitch axis.

11. The hub according to claim 10, wherein the number of stiffening webs is three or four.

12. The hub according to claim 11, wherein the hollow body comprises at least two and preferably three flanges each defining a flange area and wherein each flange area is provided with at least two stiffening webs with the shape, number, and/or arrangement of the stiffening webs within each flange area being identical or different.

13. The hub according to claim 12, wherein the hollow body comprises a first end for mounting to a rotor shaft and a second end opposite to the first end and wherein the hollow body within areas between adjacent flanges and its first or second end or both ends is provided with additional apertures.

14. The hub according to claim 13, wherein the hollow body in case of comprising three flanges is provided with three additional apertures adjacent its first and second ends.

15. The hub according to claim 14, wherein the hollow body comprises a first end for mounting to a rotor shaft and a second end opposite to the first end and wherein the hollow body at its first or second end comprises a hole.

16. The hub according to claim 15, wherein the hollow body at its second end comprises a deepened area with a man hole located therein.

17. The hub according to claim 1, wherein at least one of the stiffening webs extends substantially parallel to the rotation axis of the hollow body.

18. The hub according to claim 1, wherein the width or the thickness or both of the stiffening webs decreases towards the center of the flange area.

19. The hub according to claim 1, wherein the stiffening webs are solid or hollow.

20. The hub according to claim 1, wherein the hollow body comprises a first end for mounting to a rotor shaft and a second end opposite to the first end and wherein the hollow body at its first or second end comprises a hole.

* * * * *